United States Patent [19]

Stokes

[11] 4,046,061

[45] Sept. 6, 1977

[54] FOUR-WAY CLEVIS VALVE AND METHOD

[75] Inventor: Richard F. Stokes, Phoenix, Ariz.

[73] Assignee: The Garrett Corporation, Los Angeles, Calif.

[21] Appl. No.: 637,441

[22] Filed: Dec. 3, 1975

[51] Int. Cl.$^2$ .................... F15B 13/044; F16K 11/00

[52] U.S. Cl. .................... 91/459; 91/464; 91/467; 137/625.45; 137/625.65

[58] Field of Search .................... 91/459, 467, 466, 464; 137/625.31, 625.21, 625.65, 625.61, 625.25, 625.2, 625.28, 625.45

[56] References Cited

U.S. PATENT DOCUMENTS

| | | | |
|---|---|---|---|
| 6,128 | 2/1849 | Mulbery | 137/625.25 |
| 219,161 | 9/1879 | Kimmel | 137/625.25 |
| 636,394 | 11/1899 | Bailey | 137/625.25 |
| 3,028,880 | 4/1962 | Reitman | 137/625.61 |
| 3,062,192 | 11/1962 | Webb | 91/464 X |
| 3,200,844 | 8/1965 | Jackson | 137/625.2 |
| 3,762,441 | 10/1973 | Kaufman | 137/625.65 X |
| 3,805,835 | 4/1974 | Jansen | 251/282 X |

*Primary Examiner*—Irwin C. Cohen

*Attorney, Agent, or Firm*—James W. McFarland; Albert J. Miller

[57] ABSTRACT

A four-way fluid flow control valve for selectively interconnecting opposite sides of a fluid motor with a source of fluid pressure and a low pressure return line for driving the motor in opposite directions. A clevis-like, bifurcated metering member has opposed, cup-shaped elements at its bifurcated end which are shiftable across opposed, flat surfaces to produce the desired fluid flow interconnections. The cup-like elements present fluid transfer zones for selectively interconnecting different fluid flow passages.

3 Claims, 5 Drawing Figures

FOUR-WAY CLEVIS VALVE AND METHOD

BACKGROUND OF THE INVENTION

This invention relates to fluid flow control instrumentality, and relates more particularly to an improved four-way fluid control valve having a clevis-like metering member similar to that described in U.S. Pat. No. 3,805,835 of Harvey B. Jansen.

The above referenced patent describes a fluid control valve structure which utilizes a bifurcated clevis member that is shiftable across a pair of opposed metering orifices to precisely control fluid flow. In comparison to other type of control valves, the structure referred to reduces the tendency of the metering orifices to clog with contaminants, minimizes mechanical hysteresis of the valve, reduces effort required in actuating the valve, and provides a balanced flow arrangement which substantially reduces power consumed by valve and produces excellent frequency response characteristics. The structure disclosed in the subject patent, however, is directed towards the control of fluid flow only between a passage communicating with the metering orifice and the chamber into which the metering orifice opens.

SUMMARY OF THE INVENTION

It is a primary object of the present invention to provide control valve structure and method which incorporates the advantages described in the above referenced patent, and which is also operable as a flow control device capable of providing selective interconnection of a variety of flow control passages to perform multi-function fluid directional flow control.

More particularly, it is the object of the present invention to provide improved method and apparatus for a four-way, closed center fluid flow control valve utilizing a clevis-like element for accomplishing desired interconnections of a variety of fluid flow passages.

The present invention achieves the preceding objects by utilizing a clevis-like, bifurcated metering member having a pair of cup-like elements at its bifurcated end which slide across substantially flat, opposed surfaces onto which the fluid carrying passages open. The cup-like elements cooperate with the adjacent surfaces to define fluid transfer zones therebetween such that movement of the bifurcated metering member selectively interconnects the passages through the transfer zones.

Another important object of the present invention is to provide structure as set forth in the preceding objects wherein the metering member is directly connected to or is the armature of a solenoid operated actuator, the metering member requiring minimal force due to balanced flow and minimal sliding friction.

These and other objects and advantages of the present invention are specifically set forth in or will become apparent from the following detailed description of a preferred embodiment of the invention when read in conjunction with the accompanying drawings.

DETAILED DESCRIPTION OF THE PREFERRED EMBODIMENT

Figure 1:
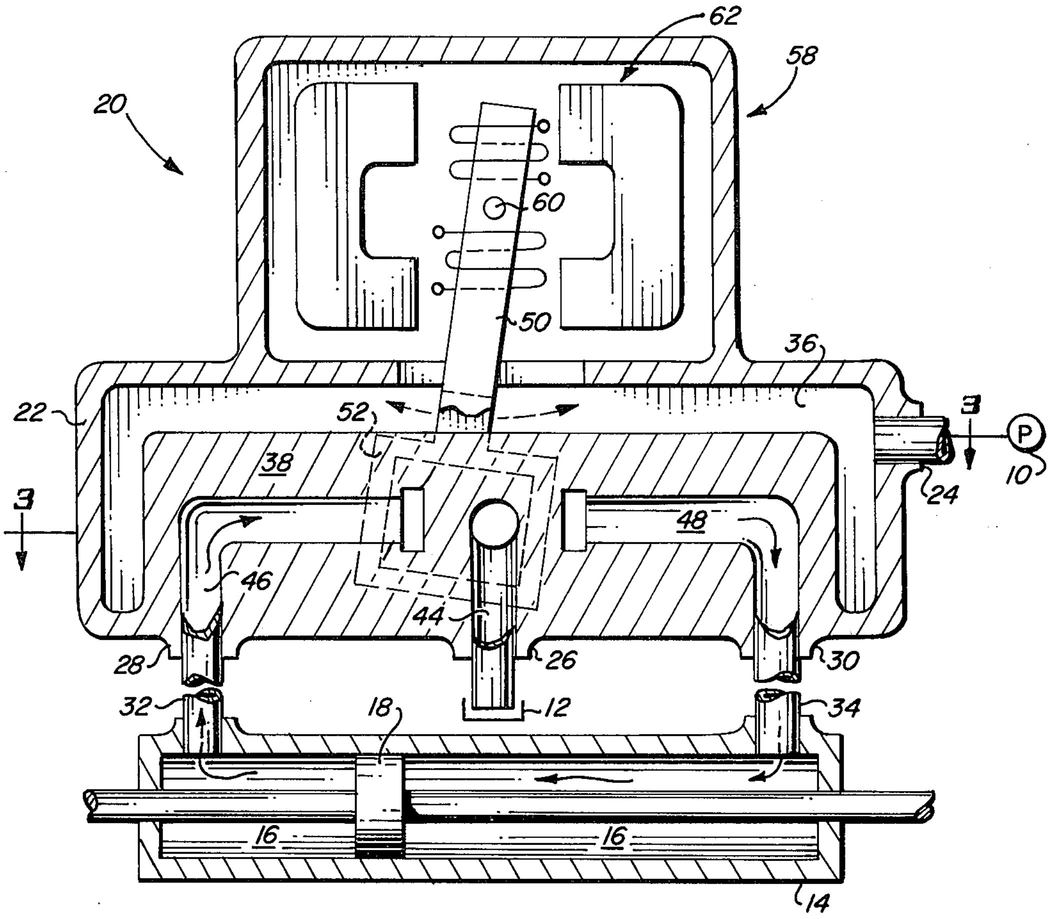
FIG. 1 is a partially cross-sectional, partially schematic representation of a fluid flow control system constructed in accordance with the principles of the present invention.
Figure 2:
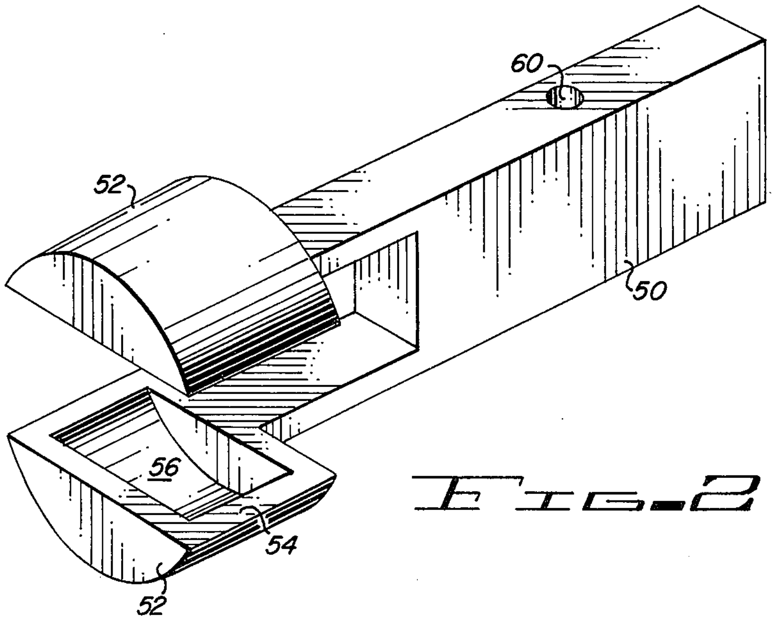
FIG. 2 is a perspective view of the bifurcated control member.

Referring now more particularly to the drawings, FIG. 1 illustrates a fluid flow control system including a source of pressurized fluid or pump 10, a low pressure fluid reservoir 12, and a fluid operated motor in the form of a double-acting cylinder 14 having a pair of opposed internal chambers 16 separated by a piston 18 traversing the interior of the motor. Disposed between the pump, reservoir and motor is four-way, closed center fluid flow control valve, generally designated by the numeral 20, operable to selectively interconnect the opposing chambers 16 with either the pump or reservoir.

Valve 20 includes a housing 22 having an inlet port 24, outlet port 26, and a pair of work ports 28, 30 respectively connected to opposite motor ports 32, 34 which communicate with the opposed internal motor chambers 16. Housing 22 also has an internal cavity 36 communicating with one of the inlet and outlet ports, herein illustrated as communicating with inlet port 24. Housing 22 further includes a portion 38 integrally formed or otherwise substantially rigidly affixed to the housing. Portion 38 has opposed, flat, transversely spaced surfaces 40, 42 exposed to internal cavity 36. Within portion 38 are first, second and third internal passages 44, 46 and 48 which respectively interconnect with the exhaust port 26 and the two work ports 28, 30. Through associated cross passage openings, each of the internal passages 44, 46 and 48 open onto both opposed surfaces 40, 42 at laterally spaced locations along portion 38, with the first passage 44 located intermediate the work passages 46 and 48.

Valve 20 further includes a bifurcated, directional flow control member in the form of a longitudinally elongated member 50 having a bifurcated end straddling opposed surfaces 40, 42. At the bifurcated end of the control member are a pair of sections in the form of cup elements 52 disposed in cooperating relationship with the adjacent surface 40, 42. Each cup element 52 has a closed side and an opposite open side facing the adjacent surface 40,42. Further, each cup element has a continuous, peripheral wall 54 whose width is just slightly less than the width of the rectangular openings associated with work passages 46 and 48. In cooperation with the adjacent surface 40, 42, each cup element defines a substantially closed fluid transfer zone 56 within peripheral wall 54. Each cup element is disposed closely adjacent but slightly spaced from the associated wall 40,42. In practice, the peripheral wall 54 will be within 0.0002 inches of the adjacent wall 40 or 42.

The end of control member 50 opposite its bifurcated end is acted upon by a solenoid operated actuator 58 carried by housing 22. This opposite end of control member 50 is pivotally secured to the housing in such a manner that upon rotation about pivot point 60, the cup-shaped elements 52 shift primarily in a lateral direction between the passages 44, 46 and 48. Because of the relatively low effort required to pivot member 50, this upper end of member 50 may be the armature portion of solenoid operated actuator 58. Actuator 58 further includes appropriate electrial coil and windings 62 which allow actuation of control member 50 to pivot in opposite directions. Preferably, a return mechanism such as a spring (not shown) may be included to position control member 50 in its center, neutral position illustrated in FIG. 3 whenever the solenoid actuator 58 is not electrically energized. While the interior of actuator 58 is illustrated as in communication with internal cavity 36, a sealing mechanism may be incorporated, if desired, to avoid fluid communication with the cavity 36.

Figure 3:
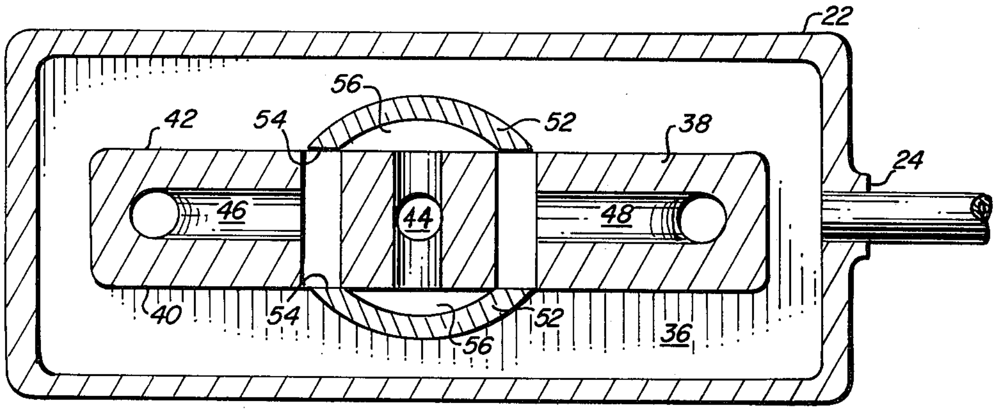
FIG. 3 is a transverse cross-sectional view taken generally along lines 3—3 of FIG. 1.
Figure 4:
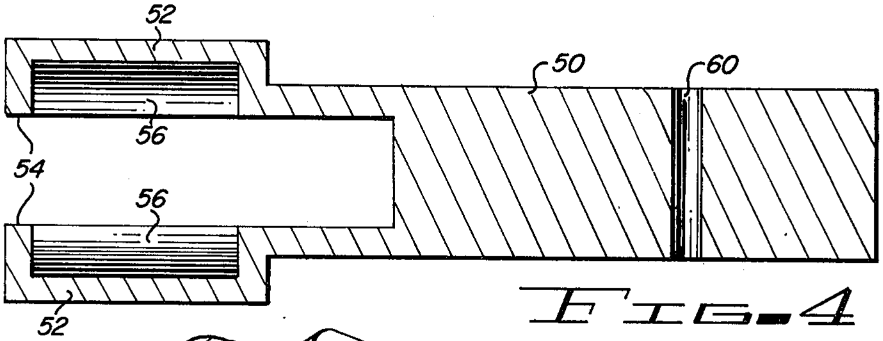
FIG. 4 is a longitudinal cross-sectional view of the bifurcated metering member.
Figure 5:
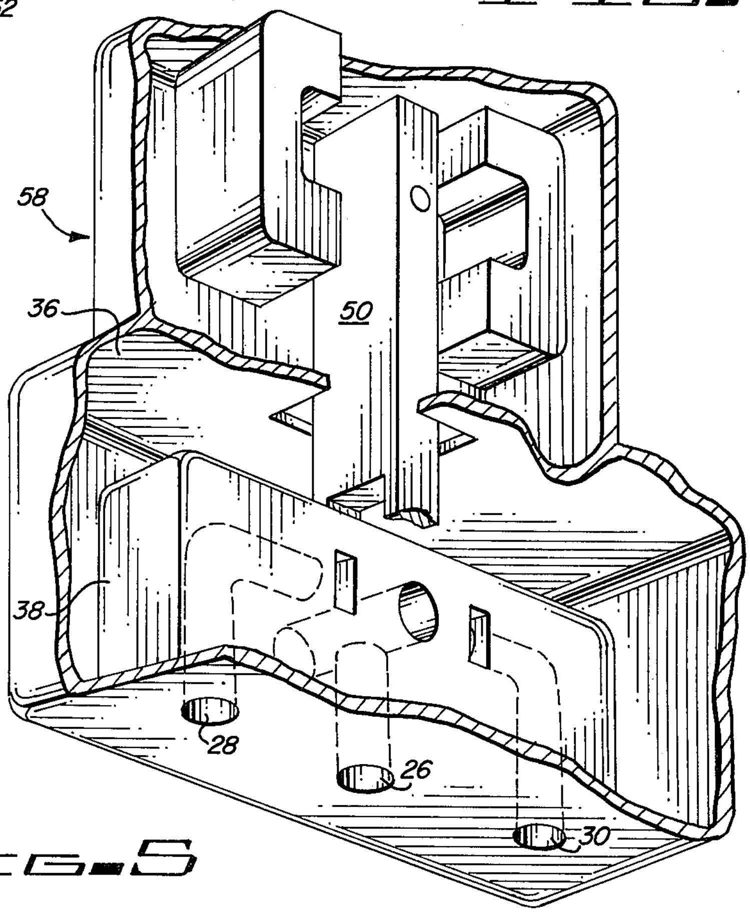
FIG. 5 is a perspective, fragmentary view of the control valve of FIG. 1 with portions broken away to reveal details of construction.

In operation, motor piston 18 remains at rest whenever the control member 50 is disposed in the first position illustrated in FIG. 3. In this position, the peripheral walls 54 are in alignment with and substantially cover the openings communicating with work passages 46 and 48. While preferably walls 54 are slightly "underlapped" relative to the size of the openings for purposes of stability as is well known equal minimal fluid flow in and out of chamber 16 occurs in this position of control member 50 to hold piston 18 at rest. Upon energizing actuator 58 in one manner, control member 50 is pivoted such that the cup elements 52 shift laterally relatively leftwardly to the position illustrated in FIG. 1. In this second position, the work passage 48 is in open communication with internal cavity 36, while the other work passage 46 communicates with exhaust passage 44 via both fluid transfer zones 56. Pressure fluid from inlet port 24 enters the right-hand chamber 16 to shift piston 18 leftwardly, the fluid displaced from the left-hand chamber 16 returning to reservoir 12 through the fluid transfer zones 56. In this position it will be apparent that the work passage 46 and return passage 44 constitute a pair of fluid passages which are selectively interconnected via fluid transfer zones 56.

Similarly, upon opposite operation of actuator 58, control member 50 may be shifted oppositely from its neutral, FIG. 3 position so as to interconnect the pair of passages 44 and 48 through fluid transfer zones 56 while allowing communication of the other work passage 46 with internal cavity 36 and inlet port 24. In this disposition it will be apparent that piston 18 is driven in an opposite direction. As control member 50 is shifted oppositely from its center position toward the other two operating positions described, the peripheral walls 54 variably cover and uncover the associated passages 46 and 48 so as to provide variable metering of fluid flow in and out of motor 14 to control speed of operation thereof.

Throughout the entire operation described above, the arrangement and configuration of the clevis-like element 50 in association with the flat surfaces 40 and 42 assure substantially balanced, equal flow through the fluid transfer zones 56. Substantially zero static and dynamic net flow forces are exerted upon member 50 to thereby minimize the force required in pivoting the latter. Such arrangement further minimizes mechanical hysteresis in the valve, assures precise fluid flow metering, and produces excellent frequency response characteristics.

From the foregoing it will be apparent that the present invention contemplates an improved method of controlling fluid communication between a pair of fluid passages such as passages 44 and 46 both of which open onto opposed surfaces 40 and 42, which includes the steps of positioning a metering control member exteriorly adjacent each of surfaces 40 and 42 to define the substantially closed transfer zones 56 therebetween. By effecting relative movement between the transfer zones and the adjacent pair of passages, these latter passages can be selectively interconnected through both the transfer zones in such a manner as to provide substantially balanced flow through the transfer zones while the passages are interconnected. Due to the transversely symmetric configuration of passages 44, 46 and 48 as illustrated in FIG. 3, substantially simultaneous interconnection of the adjacent passages through both the transfer zones is accomplished.

While a preferred embodiment of the invention has been described in detail above, it will be apparent that various modifications and alterations to the described structure can be made without departing from the scope and spirit of the invention as set forth in the appended claims. For instance member 50 may be actuated manually or by any other desired mechanism other than actuator 58, or the inlet and outlet ports 24, 26 may be switched so that the inlet port communicates with passage 44 while the outlet port communicates with the internal cavity 36.

Having described the invention with sufficient clarity that those skilled in the art may make and use it, I claim:

1. In combination with a fluid control system including a source of pressurized fluid, a low pressure reservoir, and a fluid operated motor having a pair of motor ports communicating with opposed fluid chambers of the motor; a closed center flow control valve comprising:

a housing having an internal cavity, an inlet port communicating with said source of fluid, an exhaust port communicating with said reservoir, and a pair of work ports communicating with said motor ports, said internal cavity communicating with one of said inlet and outlet ports;

means in the housing defining a pair of substantially flat, opposed, transversely spaced surfaces exposed to said cavity, said means having a first passage therein communicating with the other of said inlet and outlet ports, and second and third passages therein communicating with said work ports, each of said first, second and third passages opening onto both of said opposed surfaces at laterally spaced locations therealong with said first passage disposed intermediate said second and third passages;

a longitudinally extending control member in said housing having a bifurcated end straddling said means defining said opposed surfaces, said member pivotally mounted to said housing whereby said bifurcated end shifts primarily laterally along said surfaces as the member pivots;

a pair of cup elements affixed to said bifurcated end of the control member, each of said cup elements having a continuous, flat peripheral wall slightly spaced from the adjacent surface and cooperating therewith to define a fluid transfer zone between the cup element and the adjacent surface;

said member pivotal to shift said cup elements laterally in one direction from a first central position wherein said peripheral walls substantially cover said second and third passages toward a second position wherein said first and second passages are interconnected through said fluid transfer zones while said third passage is open to said internal cavity, said member pivotal to shift said cup elements laterally in an opposite direction from said first position toward a third position wherein said first and third passages are interconnected through said fluid transfer zones while said second passage is open to said internal cavity; and solenoid operated actuator means carried by said housing and operable upon the end of said control member opposite said bifurcated end for selectively pivoting said control member to shift said cup elements in said one and said opposite directions, said peripheral walls of the cup elements operable to variably meter fluid communication of said first passage respectively with said second and third passages through said fluid transfer zones while providing substantially balanced flows through said transfer zones as said cup elements respectively shift in said one and said opposite directions, said peripheral walls being of slightly less width than the openings on said surfaces communicating with said second and third passages to permit restricted communication directly between each of said second and third passages and said cavity in said first central position of said member.

2. A combination as set forth in claim 1, wherein said internal cavity is in continuous communication with said inlet port, and said first passage is in continuous communication with said exhaust port.

3. A fluid flow control device, comprising:

a housing having an internal cavity and a part connected thereto, a pair of spaced, opposed surfaces, and first, second, and third internal fluid passages separate from said cavity, each of said passages opening onto both of said opposed surfaces at laterally spaced locations therealong, said first passage disposed intermediate said second and third passages;

a bifurcated member in said cavity mounted for pivotal movement and having a section disposed exteriorly adjacent each of said opposed surfaces, each of said sections having a closed side, an open side facing the adjacent surface of the housing, and a continuous peripheral wall at said open side cooperating with said adjacent surface to define a transfer zone between said closed side and said surface; and means for effecting relative pirotal movement between said member and said housing in opposite directions, away from a first, central position wherein said peripheral walls substantially cover the openings on said surfaces communicating with said second and third passages, respectively toward second and third positions interconnecting said first passage respectively with said second and said third passage through both of said transfer zones while providing substantially balanced flows through said transfer zones, said peripheral walls being of slightly less width than said openings on the surfaces to permit restricted communication directly between each of said second and third passages and said cavity in said first, central position.

* * * * *

UNITED STATES PATENT AND TRADEMARK OFFICE

CERTIFICATE OF CORRECTION

PATENT NO. : 4,046,061

DATED : Sept. 6, 1977

INVENTOR(S) : Richard F. Stokes

It is certified that error appears in the above-identified patent and that said Letters Patent are hereby corrected as shown below:

Column 5, line 27, read "part" as --port--.

Column 6, line 13, read "pirotal" as --pivotal--.

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*